April 19, 1960
B. VER NOOY
2,932,837
CONDUIT CLEANING DEVICE
Filed Dec. 1, 1953
2 Sheets-Sheet 1
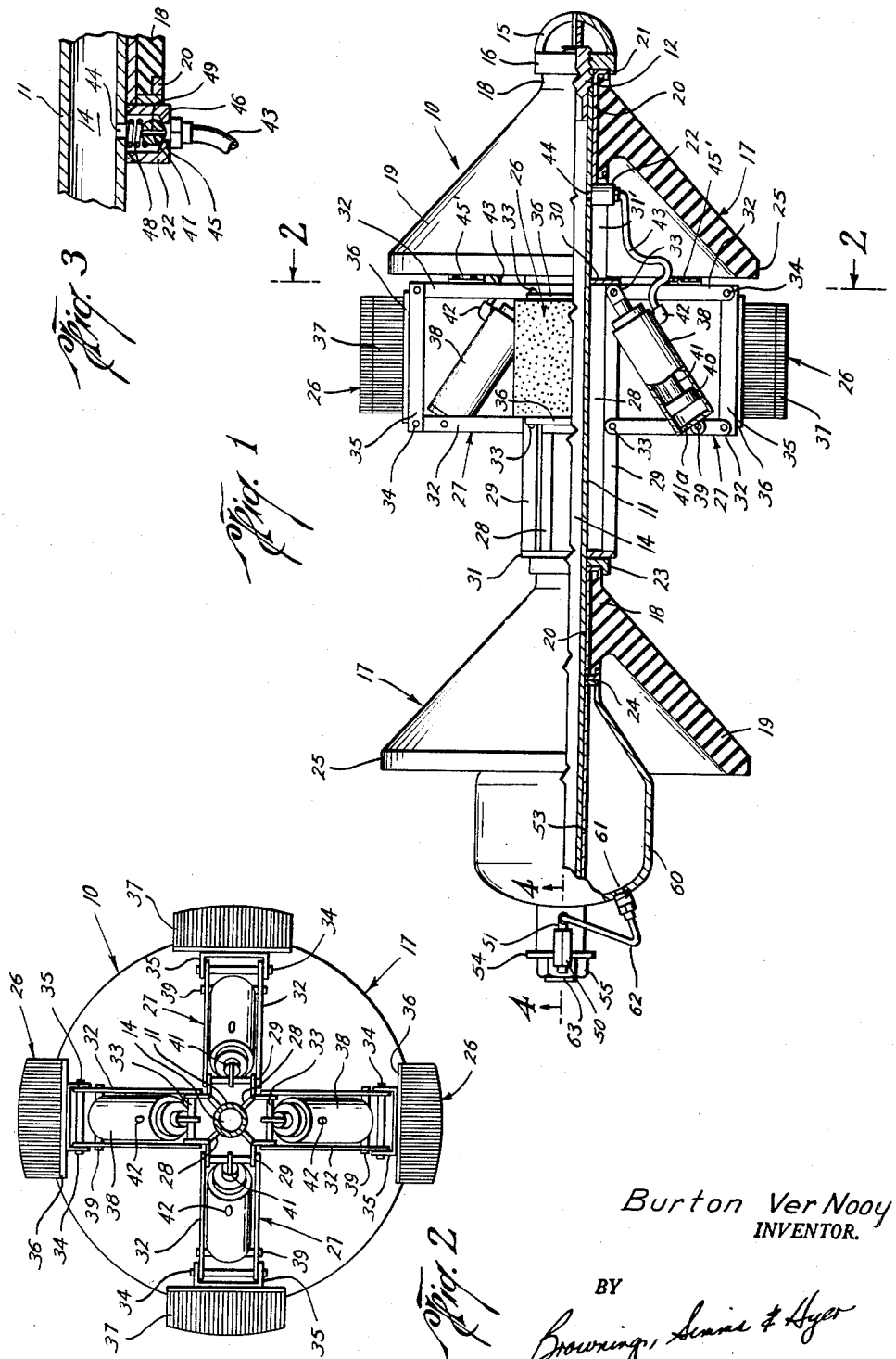
Burton Ver Nooy
INVENTOR.
BY
ATTORNEYS April 19, 1960
B. VER NOOY
2,932,837
CONDUIT CLEANING DEVICE
Filed Dec. 1, 1953
2 Sheets-Sheet 2
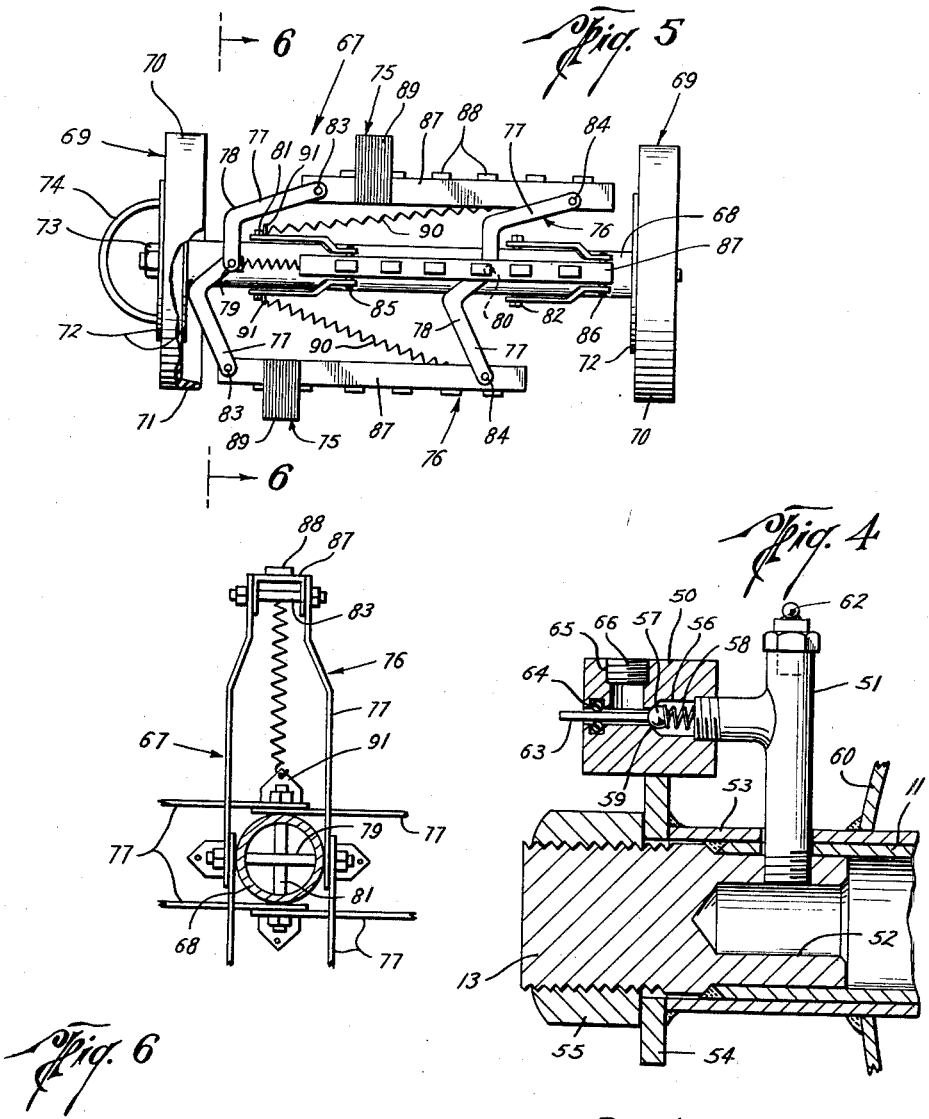
Burton Ver Nooy
INVENTOR.
BY
ATTORNEYS

United States Patent Office 2,932,837
Patented Apr. 19, 1960

2,932,837

CONDUIT CLEANING DEVICE

Burton Ver Nooy, Tulsa, Okla., assignor to T. D. Williamson, Inc., Tulsa, Okla., a corporation of Oklahoma Application December 1, 1953, Serial No. 395,363

1 Claim. (Cl. 15—104.18)

This invention relates broadly to devices for cleaning conduits such as pipelines. In one of its aspects, it relates to devices especially well suited for cleaning pipelines of varying cross-sectional size or having restricted portions of reduced cross-sections.

The conventional pipeline scraper or cleaner in common use today comprises a central body upon which is mounted a plurality of scraper elements for engagement with the inner wall of the pipeline to be cleaned, the scraper elements usually being mounted by means of leaf springs which have one end attached to the scraper body and the other to one of the scraper elements so as to urge the latter into scraping engagement with the inner walls of the pipeline. In this manner, the scraper element has limited radial movement so as to accommodate some variation in pipeline diameter, out-of-roundness of the pipe and other minor deformities. Such an arrangement presents serious disadvantages when it is desired to clean a pipeline having considerable variation in cross-sectional size along its length, such as one having valves therein of considerably smaller nominal size than that of the pipeline. The spring mounting of the scraper elements seriously limits the extent they can retract and expand radially and yet perform a satisfactory scraping operation. For example, the spring mountings for the scraper elements are so arranged that they urge the scraper elements with increasing force against the pipeline walls as the diameter of the latter decreases so that, as a result, the scraper elements exert their greatest rubbing friction on the pipeline when passing through a reduced cross-sectional area portion thereof. This may not only result in the entire scraper becoming stuck in the line but also can cause considerable damage to the scraper when increased driving fluid pressure is applied in an effort to dislodge the scraper. The extent of possible damage to the scraper and to the pipeline can be more easily visualized when it is considered that even a relatively small pressure differential applied across the entire cross-sectional area of a stuck scraper in a pipeline results in a large total force tending to push it past the obstruction. For example, the application of a pressure differential of 20 pounds per square inch to a scraper having a 24 inch diameter results in a total endwise force on the scraper in excess of 4 tons.

Another disadvantage of the leaf spring mountings for the scraper elements is that the force with which the springs urge the elements against the pipeline walls varies considerably, for any given set of springs, as the pipeline diameter varies. Hence, in order to maintain scraper element pressure on the pipeline within an accepted range, it has been considered necessary to limit the use of each size of springs to a relatively narrow range in pipe sizes and to provide a different scraper having springs of different size for each such range of pipe sizes. Moreover, the pipe size range within which any given size of spring can successfully operate is further limited either by the inherent instability of the spring when expanded to accommodate larger pipe sizes or by the fact that in many spring-scraper element arrangements, the working face of the scraper element changes in its angular position with respect to the pipe wall as the element is moved radially to accommodate different sizes of pipe. Accordingly, as the scraper element becomes cocked with respect to the pipe wall, wear on its working face becomes uneven as does its scraping action on the pipe wall.

It is, therefore, a primary object of this invention to provide an improved pipeline cleaner or scraper which is especially well-suited for cleaning a pipeline having a restricted portion of relatively smaller cross-sectional flow area than that of the remainder of the pipeline.

Another object is to provide a pipeline scraper or cleaner which can be successfully employed to clean or scrape pipelines of substantially different size.

Still another object of this invention is to provide an improved pipeline cleaner having novel means for mounting the cleaning elements thereof, this novel means being arranged so that the cleaning elements may be moved to accommodate widely varying diameters of pipeline in a new and improved manner.

Still another object of this invention is to provide a pipeline cleaner employing a self-contained gas charge to urge the cleaning elements of the cleaner into engagement with the pipeline, whereby the pressure of the cleaning elements against the pipeline wall is governed by the pressure of the gas charge.

Other objects, advantages and features of this invention will be apparent to one skilled in the art upon a consideration of the written specification, the appended claims, and the attached drawings. In the drawings, wherein like reference characters are used throughout to designate like parts:

Fig. 1 is a side elevational view, partly in section, of a preferred embodiment of the pipeline cleaner of this invention;

Fig. 2 is an end view, partly in section, of the embodiment of Fig. 1, taken along the line 2—2 of Fig. 1;

Fig. 3 is an enlarged detailed sectional view of a ball check valve shown in Fig. 1 as disposed in the connection between the gas chamber in the cleaner body and the actuating cylinders for the cleaning elements;

Fig. 4 is an enlarged sectional view taken along line 4—4 of Fig. 1;

Fig. 5 is a side elevational view of another cleaning device, showing one of the cleaning elements in extended position and another in retracted position; and Fig. 6 is a somewhat enlarged partial end sectional view, taken substantially along the line 6—6 of Fig. 5.

According to the present invention, there is provided a pipeline cleaner or scraper having a body and one or more cleaning or scraper elements connected thereto by a suitable linkage which maintains these elements in substantially constant angular relation with respect to the body portion or substantially parallel to the normal pipeline wall to be cleaned. As well, the cleaning elements are resiliently urged outwardly into engagement with the pipeline walls by a pressure means which is so arranged as to exert a force of decreasing effect in urging the elements outwardly as the elements are moved toward the body of the cleaner upon passing into restricted portions of the pipeline so as to decrease the likelihood of the cleaner becoming stuck in such restricted portions.

According to a preferred embodiment of this invention, this means for urging the cleaning elements outwardly into engagement with the pipeline walls comprises a pressure responsive means actuated by a charge or source of gas under pressure, which source is carried by the body of the cleaner. In accordance with another novel aspect of this invention, the gas pressure source may be replenished or changed in pressure while the cleaner is in use within a pipeline. Also, the pressure responsive means is operable to permit the cleaning elements to be collapsed rapidly toward the body portion so that adjustment to a restriction in the pipeline can be quickly made, and yet to permit the elements to be expanded more slowly outwardly toward the pipeline walls to prevent their jumping out into a side opening in the pipeline.

Referring now to the drawings, there is shown in Figs. 1 and 2 the preferred form of cleaning device 10 constructed in accordance with this invention and adapted to be moved forwardly (left to right in the drawing) through a pipeline or like conduit (not shown). This device includes an elongate body 11 which is closed at opposite ends by front and rear bushings 12 and 13, respectively, to form a gas tight chamber 14 for containing a charge of gas. The front end of the body is provided with a nose or bumper assembly for engagement with obstructions disposed across the center of the pipeline. This assembly includes an open framework nose piece 15 secured to a ring member 16 which is threaded onto the outer end of the front bushing 12.

A pair of flexible members or cups 17 may be carried by and spaced along body 11 for flowing fluid in the pipeline to act against to move the cleaner along the pipeline, as well as to provide some support for suspending body 11 in the pipeline.

Each of the flexible cup members comprises a hub portion 18 having a cone-shaped skirt 19 extending angularly therefrom. The hub of each member is retained in a flanged cylindrical collar 20 which surrounds body 11. The collar for the front flexible member 17 is fixed to the body between a flange 21 on ring member 16 and a series of valve housings 22 fixed to the body, while the collar for the rear flexible member is fixed between a flanged member 23 and an abutment 24, both of which are held in place on the body in a manner to be described.

The member 17 may be formed of rubber, neoprene, or like flexible material which is resistant to the fluid which the members may contact in the pipeline. Skirts 19 extend angularly outwardly from hub portions 18 to place lip portions 25 in sealing engagement with the inside wall of the pipeline. As a fluid pressure differential is applied across the cup members from the downstream side thereof, such pressure tends to stretch the members outwardly against the pipeline walls. It is preferred that the skirts have a cross-sectional diameter at lip portions 25 which is slightly larger than the pipe to be cleaned so that upon insertion of the cleaner into the pipeline there will be at least some radial compression of the lip portions to assure an effective initial seal with the pipeline. When the cleaner attempts to pass through a portion of the pipeline having a reduced cross-sectional flow area, the cone-shaped skirts of the flexible members permit them to be radially compressed throughout a fairly wide range so that they are especially well adapted for passage through pipelines of varying diameters. When the cleaning device encounters a restriction in the pipeline of considerably smaller cross-sectional flow area, such as a relatively small valve, the first flexible cup member can fold inwardly to pass through the restriction while the rearmost cup member is still effective across the pipeline upstream of the restriction to drive the front member through the restriction. When upon the front member being freed from the restriction, it will unfold to become effective across the line to pull the rear member through the restriction. However, it should be noted that even if both members were folded inwardly, they still would limit flow of pipeline fluid therepast sufficiently to create a pressure differential for moving the cleaner through the line. However, it is ordinarily preferred to space the cup members far enough apart, where possible, so that both do not lie within a restriction at the same time.

The angle between the skirts 19 and the body 11 of the device is, of course, variable within limits, but it will be understood that a practical limit will be reached wherein a further increase in this angular relation would permit the higher pressure at the rear of the members 17 to actually turn back or reverse the directions of pitch of the skirts 19, thus destroying the sliding seal. In any case, however, the proper design of these parts is dependent on desired operating conditions and would come within the realm of one skilled in the art.

As previously mentioned, if desired, the flexible members might be eliminated in entirety and other means, such as a cable or rod extending through the pipeline, used for actually pulling or pushing the cleaning device longitudinally therethrough.

The means for actually cleaning the pipeline comprises cleaning or scraper elements 26 pivotally connected to the body 11 by supporting means 27. These cleaning elements and supporting means are arranged circumferentially of the body at ninety degree intervals. However, inasmuch as a plurality of cleaning devices may be arranged in series, with the cleaning elements of each staggered with respect to those of the others, the number and spacing of the individual cleaning means is not a limiting feature of this invention.

Turning now to the novel construction of the cleaning means, and particularly the supporting means 27, body 11 is provided with radially projecting longitudinal ribs 28 to which are secured angle members 29 forming longitudinally extending brackets for supporting means. Ribs 28 are held between collars 30 and 31 secured transversely to the body 11 at spaced locations therealong, the collar 30 being spaced from the forward cylindrical collar 20 by members 31' and the collar 31 being held against flanged member 23.

The supporting means is arranged to support the cleaning elements with their working faces parallel to the walls of the pipeline to be cleaned and to permit the cleaning elements to move inwardly and outwardly with respect to body 11 without changing the angular disposition of the cleaning elements with respect to the surface being cleaned. Thus, in a preferred form, the supporting means comprise four links or arms 32 of equal length, each of the links being pivotally connected toward one end to an angle member 29 by means of pins 33. More specifically, the four links are arranged in two pairs, one pair of which is pivotally connected to one angle member 29 and the other pair to an adjacent angle member. As well, one link of each pair is disposed laterally opposite a link of the other pair.

Thus, the links 32 of each pair can be pivotally connected toward their opposite ends by pins 34 to cross bars 35 in a manner to form spaced, matching parallelograms, as shown in Fig. 1. When the outer ends of each pair of links are connected together by the pins 34 or by the cleaning elements 26 carried by the cross bars, the parallelograms are caused to be moved in unison such that working faces on the cleaning elements 26 may at all times be maintained parallel with the body 11 regardless of the proximity of said elements to the body as determined by the expansion or collapse of the parallelogram. Putting it another way, the cleaning elements may at all times be maintained in a constant angular relation with respect to the body such that, regardless of the radius of the pipeline section being cleaned, said cleaning elements may be continually urged into normal engagement with the pipeline wall. In this manner, wear upon the working face of the cleaning elements will be uniform and the entire working face of the cleaning elements will always contact the inside walls of the pipeline.

Each of the cleaning elements 26 comprises a base plate 36 welded or otherwise secured to the spaced cross bars 35 and extending therebetween and a brush 37 on the plate, the brush having stiff wire bristles extending to form a working surface at least approximately corresponding to the curvature of the pipeline (see Fig. 2). Of course, it will be understood that instead of a brush, there may be employed plow-like structures, rollers, abrasive cutters and other structures adapted to scrape the interior of the pipeline.

As can be seen from Fig. 1, the supporting means may be swung practically ninety degrees from an expanded, upright position to a collapsed position thereby permitting a wide variation in the cross-sectional flow area through which the cleaning device can be passed without rendering the cleaning elements ineffective.

The novel pressure responsive means for constantly urging the cleaning elements 26 into engagement with the pipeline wall includes a cylinder 38 disposed between the spaced parallelograms of each supporting means 27 and pivotally supported at one end by a rod 39 extending between oppositely disposed links of each parallelogram. A piston 40 (Fig. 1) for the cylinder is carried on one end of a rod 41 which is pivotally connected at its opposite end to pin 33 for the other pair of oppositely disposed links. However, the piston-cylinder assembly is arranged in a nonparallel relation with respect to the top and bottom of the parallelograms and thus forms an acute angle with the working surface of the cleaning elements 26, such that movement of the cylinder 38 relative to the piston 40 causes a corresponding swinging movement of the supporting means and cleaning elements.

To illustrate, with the piston 40 disposed at its outer limit relative to the cylinder, as shown in Fig. 1, the supporting means 27 is in its upright expanded position. However, upon movement of the piston relative to the cylinder 38 and toward its opposite inner limit, the supporting means will be moved toward its collapsed position.

The outer end of the cylinders 38 are vented as at 41a while gas from a substantially constant gas pressure source is supplied to the cylinders at their opposite inner ends through inlets 42. According to one novel aspect of this invention, this pressure source, in the form of compressed air or other gas, may be contained within the closed chamber 14 of the body 11, which chamber is communicated with each of the inlets 42 to the cylinders by means of elbow connections and flexible hoses 43 (not shown in Fig. 2) which lead to outlets 44 in the chamber through passages 45 in the valve casings 22. While, of course, the movement of the pistons 40 relative to the cylinders will act to vary the pressure of this source, its effect will be negligible for the purposes of this invention in view of the relatively large volume of the chamber 14 combined with that of a gas reservoir to be described hereinafter.

Thus, assuming that the pressure acting on the inner surface of piston 40 is greater than the pressure ambient of the cleaning device within the pipeline, the piston will be normally positioned toward its outermost position in the cylinder 38, as shown in Fig. 1, so as to urge the supporting means 27 towards its upright position and cleaning elements 26 into engagement with the pipeline wall.

When the cleaning device 10 is passed through a restricted portion of the pipeline, the cleaning elements 26, as well as the flexible members 17, will be compressed inwardly toward body 11. As a result, supporting means 27 will be moved toward its collapsed position such that the piston 40 is moved relatively to the cylinder 38, thereby increasing the effective length of the cylinder assembly between its opposite pivotal connections with the supporting means. Thus, the angular relation between the force exerted axially of the cylinder assembly and the working face of the cleaning elements is decreased such that the vertical component thereof normal to the pipeline wall is also decreased. In combination then, the flexible members 17 and the supporting means 27 are not only adaptable for movement through a pipeline having a wide range of cross-sectional areas but also, according to a still further novel aspect of this invention, as the cleaning elements are passed into restricted sections of the pipeline, the pressure with which said elements are urged into normal engagement with the pipeline wall is decreased, thereby permitting the cleaning device to be readily moved past said sections.

Plates 45' may be secured to the forward links 32 of the supporting means 27 to protect from deposits removed from the pipeline wall that portion of the hose 43 which is not covered by the forward flexible member 17 during operation of the cleaner.

Should, however, the cleaning device become lodged in the pipeline, the novel construction of this invention permits it to be dislodged. That is, upon stoppage of the device the pressure within the pipeline and ambient of the cylinder 38 can be built up until a point is reached whereby this increased pressure entering the cylinder through vent 41a becomes sufficiently great relative to that of gas chamber 14 to reduce the net force exerted by piston 40 and hence the force urging the cleaning elements against the pipeline walls. In fact, the ambient pressure can be increased sufficiently to move piston 40 so as to actually collapse the supporting means 27 to move the cleaning elements out of compressive engagement with the pipeline wall.

Referring now to Fig. 3, there is provided within each of the valve casings 22 a check valve assembly for controlling the passage of gas between the chamber 14 and the cylinder 38. That is, each cylinder is in fluid communication with its respective valve assembly by means of inlet 42, flexible hose 43, and passage 45. The chamber is in fluid communication with each of said assemblies by means of outlets 44.

This valve assembly may then be considered a part of the pressure responsive means for actuating the supporting means 27 for the cleaning elements 26. For that matter, it will be understood that the valve may be disposed adjacent the outlet 42 to the cylinder 38 or at any other location between the cylinder and chamber 14. More particularly, and as previously mentioned, this portion of the pressure responsive means serves to permit the cleaning elements to be rapidly collapsed toward the body 11 but expanded outwardly therefrom relatively slowly.

Turning now to a detailed description of the valve assembly, the inner wall of the valve casing 22 is provided with a tapered valve seat 46 arranged concentrically of the passage 45. A ball valve 47 is normally urged into seating relation on the valve seat 46 by a coil spring 48 disposed between said valve and the wall of the chamber 14 surrounding inlet 44. Also, the ball valve is provided with a small bleed passage 49 therethrough to restrict the flow of gas from the chamber to the cylinder 38. On the other hand, when gas flows in the opposite direction, ball valve 47 is unseated to permit unrestricted passage of said gas through the passage 45.

As a result, the cleaning elements 26 will be compressed inwardly and the supporting means 27 rapidly collapsed when the cleaning device is passed into a restricted portion of the pipeline. On the other hand, as the device is passed into an enlarged portion, the cleaning elements may still move outwardly but at a rate which is much slower than they moved inwardly, as noted above.

The advantage of this arrangement whereby the supporting means 27 is rapidly collapsed but slowly expanded will be apparent. If, for example, in moving through the pipeline, the cleaning device 10 encounters a side opening, the cleaning elements will not suddenly jump into the opening with the possibility of either damaging the cleaner or causing it to hang up in the pipeline. In like manner, the possibility of damage when a restricted portion of the pipeline is encountered, as by sudden excessive pressure on the cleaning device and pipeline, will be lessened by permitting the cleaning elements to be rapidly collapsed.

As shown in detail in Fig. 4, valve means are also provided at the rear end of the cleaner for communicating the chamber 14 with the outside of the cleaner. This valve means is of a type which is normally closed so as to retain gas under pressure within the chamber but which may be opened from outside by a pressure of sufficiently greater magnitude than that so retained. In this manner then, in normal operation the chamber may be charged with gas at a desired pressure and contained therein at substantially the same pressure during operation of the cleaner. However, if found necessary and as will be more fully understood from a description of the valve, it permits replenishing of the gas pressure source while the cleaner is disposed within a pipeline, should, for example, the gas leak out from the cleaner during use thereof.

Specifically, this valve means comprises an elongate housing 50 in fluid communication with the chamber 14 through a connection 51 threadedly received on one end of the housing and having an extension thereof threadedly received in a socket portion 52 of the rear bushing 13. As shown in Fig. 4, the extension is received through matched openings in the body 11 and a spacer sleeve 53.

A passage 56 through the housing 50 provides communication between the connection 51 and the exterior of the cleaning device. A ball valve 57 is normally urged by a coil spring 58 into seating engagement with a tapered valve seat 59 disposed intermediate the ends of the passage 56. It will thus be understood that as long as the pressure of the gas within the chamber 14 is greater than that exteriorly of the cleaner, the ball valve 57 will remain seated and the gas will be contained within said chamber at a substantially constant pressure. Also, of course, the chamber may be charged by pressure on the opposite side of the ball valve sufficient to overcome that within the chamber. It will be appreciated then that this valve construction not only permits the chamber 14 to be charged initially prior to disposal in the pipeline, but will also permit replenishing of the gas therein while the cleaner is actually in use in the pipeline by application of the gas to the rear end of the cleaner at a sufficiently high pressure.

It was previously mentioned that movement of the pistons 40 within the cylinders 38 during movement of the cleaning elements 26 would not appreciably effect the pressure of the gas contained by the cleaner. This assurance of a substantially constant pressure source is made possible by the provision of a reservoir or chamber 60 which is arranged concentrically of the body 11 and welded to abutment 24 and spacer sleeve 53. This reservoir is of relatively large dimensions and is flared rearwardly at its forward end to permit maximum displacement of the flexible member 17 toward the cleaner body. It will be understood that when combined with the volume of the chamber 14, this reservoir provides a source of gas at substantially constant pressure of large proportions relative to the displacement volume of the pistons 40.

The reservoir 60 is in fluid communication with the chamber 14 through an opening 61, and a flexible hose 62, the latter being coupled to an extension of the connection 51. This connection 51 is then a T whereby the passage 56 and ball valve 57 permit simultaneous charging of both the chamber 14 and the reservoir 60. Both pressure sources may also be manually relieved simultaneously, if desired, by actuation of a stem 63 on the ball valve 57 and extending through the passage 56 in outwardly projecting relation to the housing 50. An O-ring seal 64 is provided about the stem at the end of the passage.

With this arrangement, the chamber 14 and reservoir 60 are charged through a side inlet 65 in the housing 50 and communicating with the passage 56. As shown, a plug 66 is threadedly received in the inlet 65 when not in use. However, in order to charge the chambers, the plug need only be removed from the inlet and a suitable source of gas under pressure attached thereto.

In this manner then, each cleaner may be individually charged and disposed within the pipeline. This operation is best performed by first placing the cleaner in the line with the cleaning elements 26 collapsed and then charging the chamber 14 and reservoir 60 so as to activate the pressure responsive means to the desired degree for urging the cleaning elements into engagement with the pipeline. Alternatively, a plurality of cleaners may be connected together and disposed within a pipeline, again with the cleaning elements of each collapsed. By supplying flexible hose connections (not shown) between the valve housing inlets 65 of succeeding cleaners to fluidly communicate them with one another, it is possible to charge each simultaneously from the rearmost cleaner. Also, inasmuch as the inlet 65 is disposed on the side of the valve 57 opposite from the chamber 14 and reservoir 60, leakage of gas from one of the cleaners would not effect the constant pressure within the others.

The above-described assembly also facilitates replacement of parts in a most expeditious manner. For example, the valve housing 50 may be readily detached from the cleaner by disengagement from the T connection 51. Also, upon disengagement of the T connection from rear bushing 13, the nut 55 may be removed and reservoir 60, along with abutment 24, spacer sleeve 53, and washer 54, may be readily removed from the end of body 11.

Another cleaning device, shown in Figs. 5 and 6 and designated in its entirety by the numeral 67, is adapted to be moved forwardly in the pipeline (from right to left in the drawings). It will be understood from the detailed description to follow that this form of cleaner is similar in many respects to the preferred embodiment already described. For example, the novel supporting means for the cleaning elements of the device 67 are especially well adapted for use in a pipeline having a moderately wide range of cross-sectional flow areas. As well, this form of cleaner serves to at all times maintain the working faces of the cleaning elements in engagement with the pipeline wall and to cause said elements to exert pressure thereon of decreasing effect as they are passed through restricted portions of the pipeline. However, this form of pipeline cleaner employs a spring means for actuating the cleaning elements and thus is not productive of the additional novel features made possible by the pressure responsive means of the cleaning device 10.

Turning now to the detailed description, this form of cleaning device also includes an elongate body 68, which may be tubular to lessen its weight, and flexible members 69 (not shown in Fig. 6) carried by and arranged concentrically with respect to the body at spaced locations therealong. Each member 69 includes a flexible disc 70 of rubber, neoprene, belting, or like material. The outer peripheral edges of the discs are provided with flanged lip portions 71 which are adapted to form sliding seals with the wall of the pipeline and to flex so as to accommodate various sizes and configurations of pipe. A substantial portion of the opposite surfaces of the discs are backed up or reinforced with rigid circular plates 72 arranged concentrically of the body 11. These reinforcing plates, in combination with lip portions 71, prevent the flexible discs from being turned back when a pressure differential is created at opposite sides of the cleaning device.

The discs 70 and plates 72 are received over reduced end portions of the body 11 and secured thereto by nuts 73. A nose-piece 74 may be secured to the front plate 72 of the leftmost flexible member 69 for engagement with obstructions across the center of the pipeline.

Similarly to the cleaning device 10, the cleaning device 67 also includes cleaning elements 75 (not shown in Fig. 6) and supporting means 76 therefor arranged circumferentially of the body 68, such as at ninety degree intervals. As well, each supporting means comprises four links 77 pivotally connected to the body and to the cleaning elements so as to form oppositely disposed parallelograms which are movable in unison from an upright expanded position (as shown by the lowermost supporting means in Fig. 5) toward a collapsed position (as shown by the uppermost supporting means). The single supporting means shown in Fig. 6 is in expanded position. However, each link 77 is bent at 78 to provide sufficient leverage in moving the supporting means toward its collapsed position.

The parallelograms of adjacent supporting means 76 are pivotally connected to the body 68 in staggered relation lengthwise thereof. That is, the links of one set of oppositely disposed supporting means are connected to the body by pins 79 and 80 which extend through and are journaled in the tubular body, while the links of the other set of oppositely disposed supporting means are connected to the body by pins 81 and 82 extending through the body at right angles to but rearwardly of the pins 79 and 80.

Toward their upper ends, the links 77 of the first-mentioned set of oppositely disposed supporting means are pivotally connected to the cleaning elements 75 by pins 83 and 84, while those of the second-mentioned set are connected to their respective cleaning elements by pins 85 and 86. Thus, as described in connection with the cleaning device 10, the cleaning elements 75 are carried by the supporting means 76 so as to maintain a constant angular relation between the working surfaces thereof and the body 68.

Each of the cleaning elements includes a channel-shaped, longitudinally extending support 87, the flanges of which provide journals for the pins 83, 84, 85 and 86. Brackets 88, to which brushes 89 (not shown in Fig. 4) or like members can be attached, are disposed along the web of the support 87. For purposes of illustration, only one brush is shown attached to the supports in Fig. 3, although it will be understood that any desired number may be used.

Each of the supporting means 76 is constantly urged to an upright position by a coil spring 90 secured at one end to the pin 84 or 86 adjacent the cleaning elements 75 and at its opposite end to brackets 91 adjacent the pin 81 or 79. Thus, similarly to the cleaning device 10, the means for urging the cleaning elements 75 into engagement with the pipeline wall acts through a force exerted at an acute angle to the working surface of said cleaning elements. Inasmuch as this angular relation is lessened as the cleaning elements are passed through restricted sections of the pipeline so as to move the supporting means towards its collapsed position, the vertical component of this force acting normally upon the pipeline wall is also reduced so as to lessen the effect of said coil spring normal to the pipeline wall. Although the tension of this spring is increased when the spring is stressed, it has not been found to appreciably effect the afore-mentioned tendency of the pressure of the cleaning element normal to the pipeline wall to be decreased when the supporting means therefor is moved toward its collapsed position.

It can thus be seen that this invention is one well adapted to attain the ends and objects thereinbefore set forth, together with other advantages which are obvious and which are inherent in the structure.

It will be understood that certain features and subcombinations are of utility and may be employed without reference to other features and subcombinations. This is contemplated by and is within the scope of the claim.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

A pipeline cleaning device comprising, a body portion adapted to be disposed in and moved longitudinally of said pipeline, a plurality of cleaning elements disposed circumferentially of said body portion, means carried by said body portion and individually connected to the cleaning elements to mount the same for movement inwardly and towards one end of the body portion, a gas pressure source carried by said body portion, fluid pressure responsive means connected to the cleaning elements and to the body portion so that upon application of fluid pressure to one side of the pressure responsive means, the cleaning elements will be urged outwardly of the body portion by the pressure responsive means into engagement with the pipeline, and means connecting said one side of said pressure responsive means with said gas pressure source.

References Cited in the file of this patent

UNITED STATES PATENTS

| | | |
|---|---|---|
| 274,756 | Gay | Mar. 27, 1883 |
| 451,841 | Platt et al. | May 6, 1891 |
| 582,953 | Robeson et al. | May 18, 1897 |
| 695,828 | Nelson | Mar. 18, 1902 |
| 1,676,825 | Haase | July 10, 1928 |
| 1,863,950 | Stubbs | June 21, 1932 |
| 2,141,491 | Searles | Dec. 27, 1938 |
| 2,447,966 | Stephens | Aug. 24, 1948 |
| 2,455,273 | Schott et al. | Nov. 30, 1948 |
| 2,474,690 | Robinson et al. | June 28, 1949 |
| 2,518,330 | Jasper et al. | Aug. 8, 1950 |
| 2,623,473 | Panzkratz | Dec. 30, 1952 |
| 2,636,202 | Hinzman | Apr. 28, 1953 |
| 2,688,218 | Taylor | Sept. 7, 1954 |

FOREIGN PATENTS

| | | |
|---|---|---|
| 22,072 | Great Britain | of 1905 |
| 162,130 | Austria | Jan. 25, 1949 |